United States Patent
Takeuchi et al.

(10) Patent No.: US 8,531,741 B2
(45) Date of Patent: Sep. 10, 2013

(54) IMAGE PROCESSING APPARATUS

(75) Inventors: Masaru Takeuchi, Handa (JP); Takayuki Akimatsu, Seto (JP); Takashi Fujiwara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 492 days.

(21) Appl. No.: 12/731,904

(22) Filed: Mar. 25, 2010

(65) Prior Publication Data
US 2010/0245947 A1    Sep. 30, 2010

(30) Foreign Application Priority Data
Mar. 31, 2009   (JP) .................................. 2009-088247

(51) Int. Cl.
*H04N 1/04*    (2006.01)
*H04N 1/46*    (2006.01)

(52) U.S. Cl.
USPC ........................... 358/498; 358/496; 358/505

(58) Field of Classification Search
None
See application file for complete search history.

(56) References Cited

U.S. PATENT DOCUMENTS

| | | | |
|---|---|---|---|
| 5,579,099 A | 11/1996 | Nishiyama et al. | |
| 6,011,936 A | 1/2000 | Kaneko | |
| 6,473,590 B2 | 10/2002 | Matsumoto et al. | |
| 7,604,228 B2 | 10/2009 | Ohama et al. | |
| 2002/0098023 A1 | 7/2002 | Mitomi | |
| 2004/0004319 A1* | 1/2004 | Hattori et al. | 271/10.01 |
| 2004/0217537 A1 | 11/2004 | Ohama | |
| 2005/0094226 A1 | 5/2005 | Burch | |
| 2006/0082051 A1 | 4/2006 | Taguchi et al. | |
| 2007/0052149 A1 | 3/2007 | Matsushima | |
| 2007/0052164 A1 | 3/2007 | Watase et al. | |
| 2007/0063430 A1 | 3/2007 | Sakakibara et al. | |
| 2009/0027738 A1* | 1/2009 | Kim | 358/474 |
| 2009/0027745 A1 | 1/2009 | Kweon | |
| 2009/0127775 A1 | 5/2009 | Takahashi et al. | |
| 2009/0255971 A1 | 10/2009 | Nakamaki et al. | |
| 2009/0323131 A1 | 12/2009 | Toyoda | |
| 2010/0245946 A1 | 9/2010 | Takeuchi et al. | |
| 2010/0245948 A1 | 9/2010 | Takeuchi | |

FOREIGN PATENT DOCUMENTS

| | | |
|---|---|---|
| CN | 1667519 A | 9/2005 |
| CN | 1944208 A | 4/2007 |
| JP | H05-191593 A | 7/1993 |
| JP | H06-343123 A | 12/1994 |

(Continued)

OTHER PUBLICATIONS

The State Intellectual Property Office of the People's Republic of China, Notification of First Office Action for Chinese Patent Application No. 201010144697.1, issued Dec. 13, 2011.

(Continued)

*Primary Examiner* — Thierry Pham
(74) *Attorney, Agent, or Firm* — Baker Botts L.L.P.

(57) ABSTRACT

An image processing apparatus includes a first conveying path, a curved conveying path, a second conveying path, a first image reading section facing the first conveying path, a pair of third conveying rollers having a third nip point P1, a pair of second conveying rollers having a second nip point P4, a second image reading section facing the second conveying path, a pair of first conveying rollers having a first nip point P3 and a pair of discharge rollers having a fourth nip point P2. A distance between P1 and P2 is larger than a distance between P3 and P4. P3 and P4 are positioned in a first area defined by imaginary lines extending upward from P1 and P2 respectively.

13 Claims, 7 Drawing Sheets

(56) References Cited

FOREIGN PATENT DOCUMENTS

| | | | |
|---|---|---|---|
| JP | H07-193680 A | 7/1995 | |
| JP | H07-209927 A | 8/1995 | |
| JP | H09-046472 A | 2/1997 | |
| JP | H09-048539 A | 2/1997 | |
| JP | H10-302993 A | 11/1998 | |
| JP | H10-330007 A | 12/1998 | |
| JP | H11-069087 A | 3/1999 | |
| JP | 2000-041133 A | 2/2000 | |
| JP | 2001-265070 A | 9/2001 | |
| JP | 2002-152462 A | 5/2002 | |
| JP | 2002-344691 A | 11/2002 | |
| JP | 2002-359725 A | 12/2002 | |
| JP | 2003-032406 A | 1/2003 | |
| JP | 2003-076074 A | 3/2003 | |
| JP | 2004-007239 A | 1/2004 | |
| JP | 2004-043178 A | 2/2004 | |
| JP | 2004-136999 A | 5/2004 | |
| JP | 2004-154981 A | 6/2004 | |
| JP | 2004-242173 A | 8/2004 | |
| JP | 2004-277144 A | 10/2004 | |
| JP | 2004-336275 A | 11/2004 | |
| JP | 2005-094473 A | 4/2005 | |
| JP | 2005-136985 A | 5/2005 | |
| JP | 2007-049414 A | 2/2007 | |
| JP | 2007-070033 A | 3/2007 | |
| JP | 2007-082095 A | 3/2007 | |
| JP | 2008-124582 A | 5/2008 | |
| JP | 2008-187595 A | 8/2008 | |
| JP | 2009-035357 A | 2/2009 | |
| KR | 2004013444 A | * | 2/2004 |

OTHER PUBLICATIONS

Japan Patent Office, Notice of Reasons for Rejection for Japanese Patent Application No. 2009-088314, mailed Nov. 8, 2011.
The State Intellectual Property Office of the People's Republic of China, Notification of the First Office Action for Chinese Patent Application No. 201010144251.9, issued Mar. 1, 2012.
Japan Patent Office, Notice of Reasons for Rejection for Japanese Patent Application No. 2009-088314, mailed Mar. 22, 2011.
The State Intellectual Property Office of the People's Republic of China, Notification of the Second Office Action for Chinese Patent Application No. 201010144697.1, issued Sep. 7, 2012.
Patent Office of the People's Republic of China, Decision of Rejection for Chinese Patent Application No. 201010144251.9, Issued Oct. 10, 2012.
Japan Patent Office, Notice of Reasons for Rejection for Japanese Patent Application No. 2010-063985, mailed Jun. 12, 2012.
Japan Patent Office, Notice of Reasons for Rejection for Japanese Patent Application No. 2010-063986, mailed Jun. 19, 2012.
United States Patent and Trademark Office, Office Action for U.S. Appl. No. 12/731,792 (related U.S. patent application), mailed Dec. 31, 2012.
Japan Patent Office, Notice of Reasons for Rejection for Japanese Patent Application No. 2010-063985, mailed Feb. 12, 2013.
Japan Patent Office, Notice of Reasons for Rejection for Japanese Patent Application No. 2010-063986, mailed Feb. 12, 2013.
The State Intellectual Property Office of the People'S Republic of China, Notification of the Third Office Action for Chinese Patent Application No. 201010144697.1 (counterpart Chinese patent application), issued Mar. 8, 2013.

* cited by examiner

IMAGE PROCESSING APPARATUS

CROSS REFERENCE TO RELATED APPLICATION

The present application claims priority from Japanese Patent Application No. 2009-088247, which was filed on Mar. 31, 2009, the disclosure of which is incorporated herein by reference in its entirety.

BACKGROUND OF THE INVENTION

1. Field of the Invention

The present invention relates to an image processing apparatus that reads an image recorded on both front and back surfaces of a sheet conveyed by a plurality of rollers.

2. Description of the Related Art

Conventionally, an image processing apparatus comprising a U-turn conveying path and two image reading portions is known. In such an image processing apparatus, an image of one of the front and back surfaces of the sheet is read by one image reading portion first, and after the front and back surfaces of the sheet is reversed, an image of another of the front and back surfaces of the sheet is read by another image reading portion.

SUMMARY OF THE INVENTION

In such an image processing apparatus comprising such a U-turn conveying path, a plurality of rotary shafts are disposed in the U-turn conveying path, a conveying roller is mounted on each of the rotary shafts, and each of the conveying rollers is paired with a pinch roller. In addition, it is preferable that a discharge tray for stacking sheets discharged from the U-turn conveying path can stack a large amount of sheets.

A need has arisen to provide an image processing apparatus that can handle the sufficient number of sheets while being compact.

In an embodiment of the invention, an image processing apparatus comprising a U-turn conveying path comprising a first conveying path on which a sheet is conveyed, a curved conveying path having an arc shape and on which the sheet conveyed from the first conveying path is conveyed and a second conveying path on which the sheet conveyed from the curved conveying path is conveyed, a first image reading section facing the first conveying path and configured to read an image recorded on a first surface of the sheet conveyed on the first conveying path, a second image reading section facing the second conveying path and configured to read an image recorded on a second surface of the sheet conveyed on the second conveying path, a pair of first conveying rollers positioned upstream of the first conveying path in a conveying direction and configured to nip and convey the sheet to the first conveying path, a pair of second conveying rollers positioned at a boundary between the first conveying path and the curved conveying path and configured to nip and conveyed the sheet to the curved conveying path, a pair of third conveying rollers positioned downstream of the curved conveying path in the conveying direction and configured to nip and convey the sheet to the second conveying roller, and a pair of discharge rollers positioned downstream of the second conveying path in the conveying direction and configured to discharge the sheet from the second conveying path, wherein the pair of the first conveying rollers, the pair of the second conveying rollers, the pair of the third conveying rollers and the pair of the discharge rollers are positioned such that a distance between a third nip point that each of the pair of the third conveying rollers contacts each other and a fourth nip point that each of the pair of the discharge rollers contacts each other is larger than a distance between a first nip point that each of the pair of the first conveying rollers contacts each other and a second nip point that each of the pair of the second conveying rollers contacts each other, and wherein the first nip point and the second nip point are positioned in a first area defined by an imaginary line extending upward from the third nip point and the fourth nip point respectively.

Furthermore, in an embodiment of the invention, an image processing apparatus capable of reading an image recorded on a first surface and a second surface of a sheet, the image processing apparatus comprising a conveying path comprising a first conveying path formed in a substantially plate shape, a second conveying path disposed below the first conveying path and a curved conveying path disposed between the first conveying path and the second conveying path, a conveying mechanism configured to convey the sheet along a conveying direction from the first conveying path to the second conveying path through the curved conveying path, a first image reading section disposed below the first conveying path and comprising a first image sensor which reads the image recorded on the first surface of the sheet conveyed along the first conveying path at a first image reading position, a second image reading section comprising a second image sensor which reads the image recorded on the second surface of the sheet conveyed along the second conveying path from below the second conveying path at a second image reading position, a feed tray disposed upstream of the first conveying path in the conveying direction and configured to hold a plurality of sheets in a stacked state, a feed unit configured to separate one of the plurality of the sheets held on the feed tray and feed the separated sheet toward the first image reading position, a discharge unit disposed below the feed unit and configured to discharge the sheet from the second conveying path, and a discharge tray disposed below the discharge unit and hold the sheet discharged from the second conveying path by the discharge unit, wherein the second conveying path extends obliquely upward from the second image reading position to the discharge unit.

According to the present invention, since each of the conveying rollers for conveying the original sheet are compactly laid out vertically, a compact design of the image processing apparatus is possible. Moreover, since a large area for stacking the discharged sheets is provided, the image processing apparatus can handle the sufficient number of sheets while being compact.

Other objects, features, and advantages of embodiments of the present invention will be apparent to persons of ordinary skill in the art from the following description of preferred embodiments with reference to the accompanying drawings.

DESCRIPTION OF THE PREFERRED EMBODIMENTS

The present invention will hereunder be described in detail on the basis of preferred embodiments with reference to the drawings as required.

[General Structure of Image Processing Apparatus]

Figure 1:
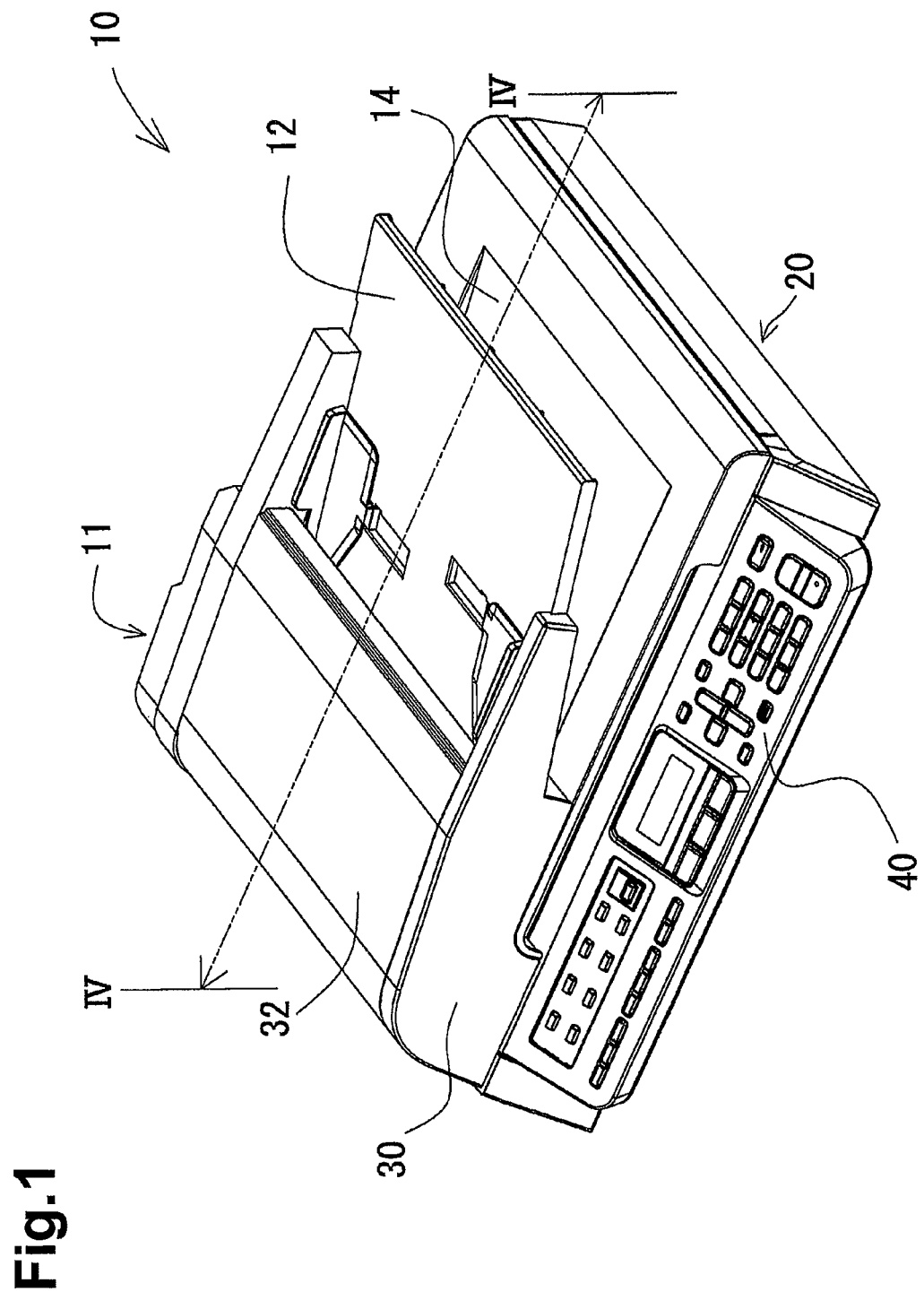
FIG. 1 is a perspective view of an image processing apparatus according to an embodiment of the present invention.

FIG. 1 is a perspective view of an image processing apparatus 10 according to an embodiment of the present invention.

The image processing apparatus 10 includes an image reading device 20, an automatic document feeder (ADF) 11 disposed at the upper portion of the image reading device 20, and an operation panel 40 provided at the front side of the image reading device 20. The ADF 11 is rotatably provided with respect to the image reading device 20. Therefore, the ADF 11 can be used to open and close the upper side of the image reading device 20 (see FIG. 2). When a user perform a reading operation without using the ADF 11, the user opens the ADF 11 and place original sheets on a predetermined position on an after-mentioned moving reading glass 80. Then, the user closes the ADF 11 and operates the operation panel 40, and thereby can read an image of an original sheet placed on the moving reading glass 80.

Figure 2:
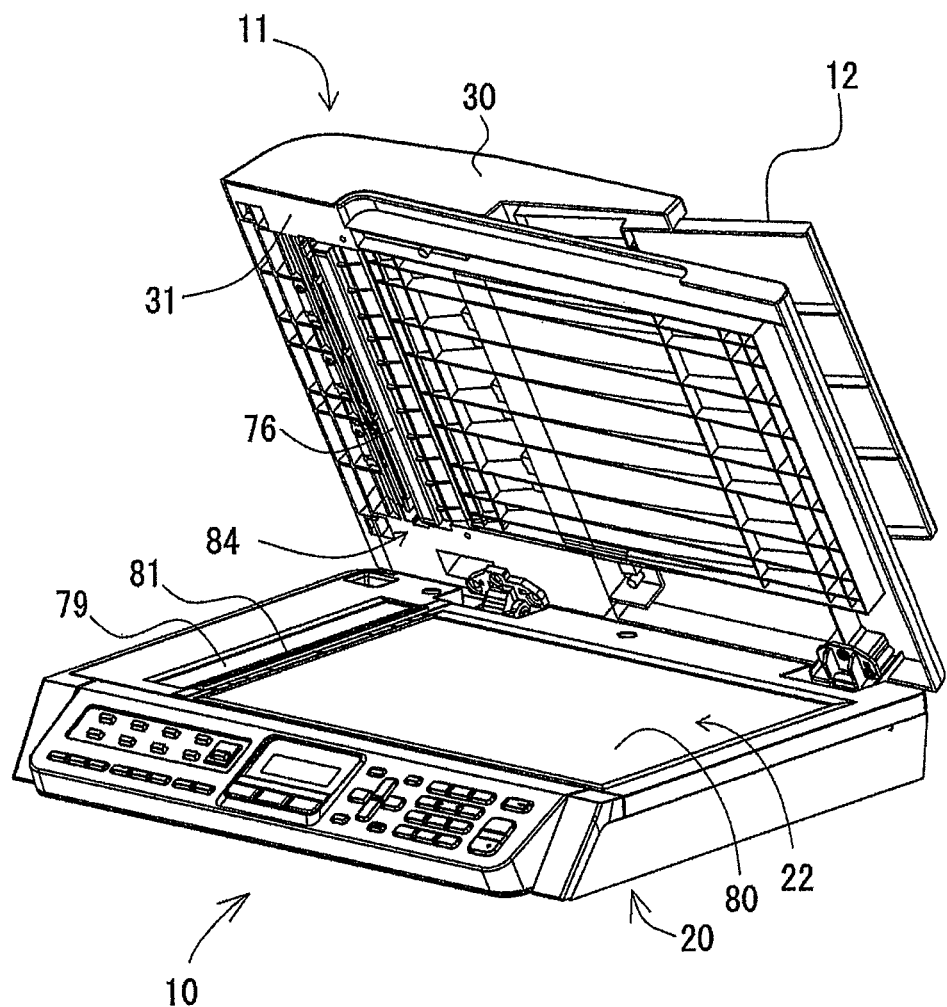
FIG. 2 is a perspective view of the image processing apparatus according to the embodiment of the present invention.
Figure 3:
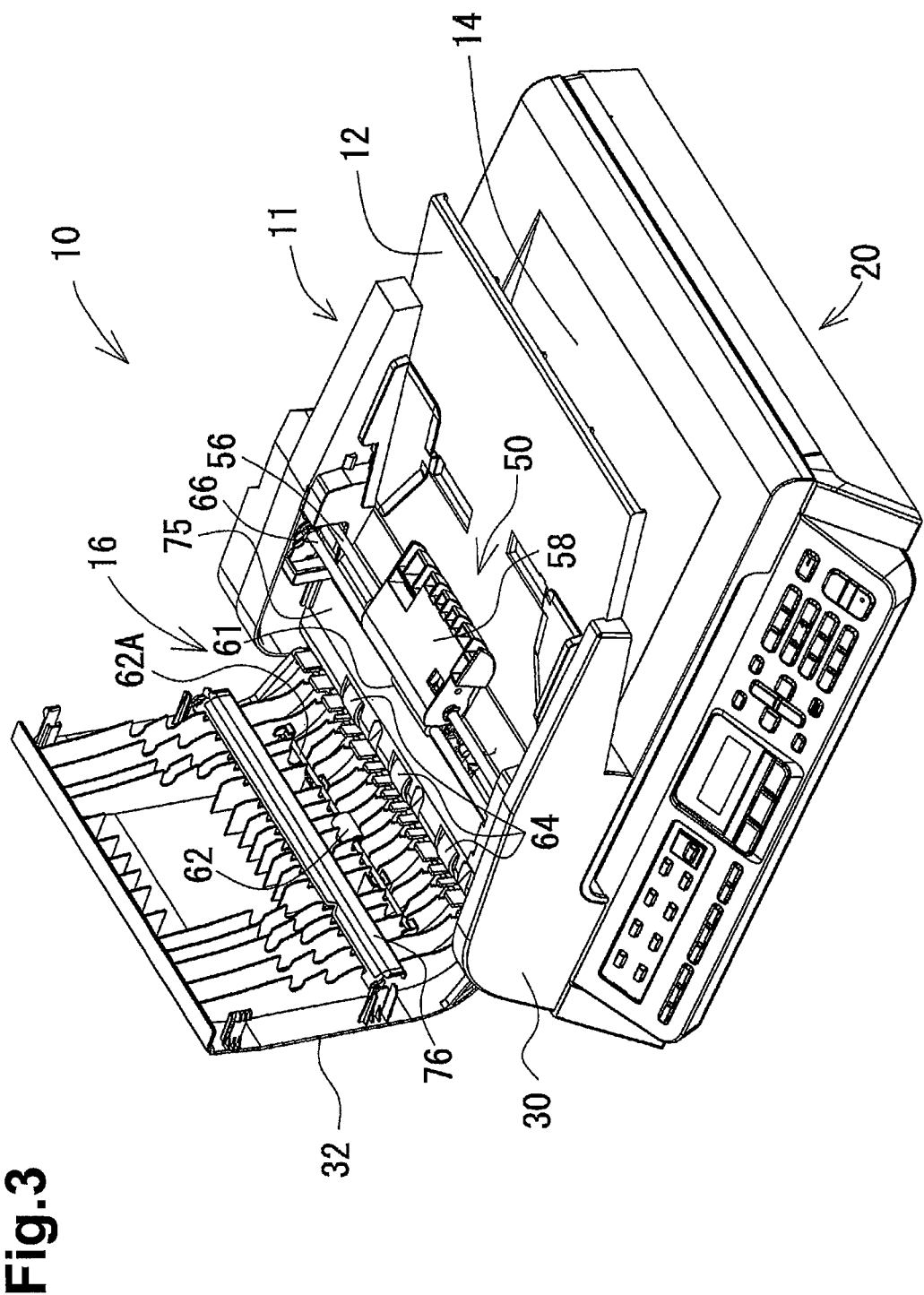
FIG. 3 is a perspective view of the image processing apparatus according to the embodiment of the present invention.
Figure 4:
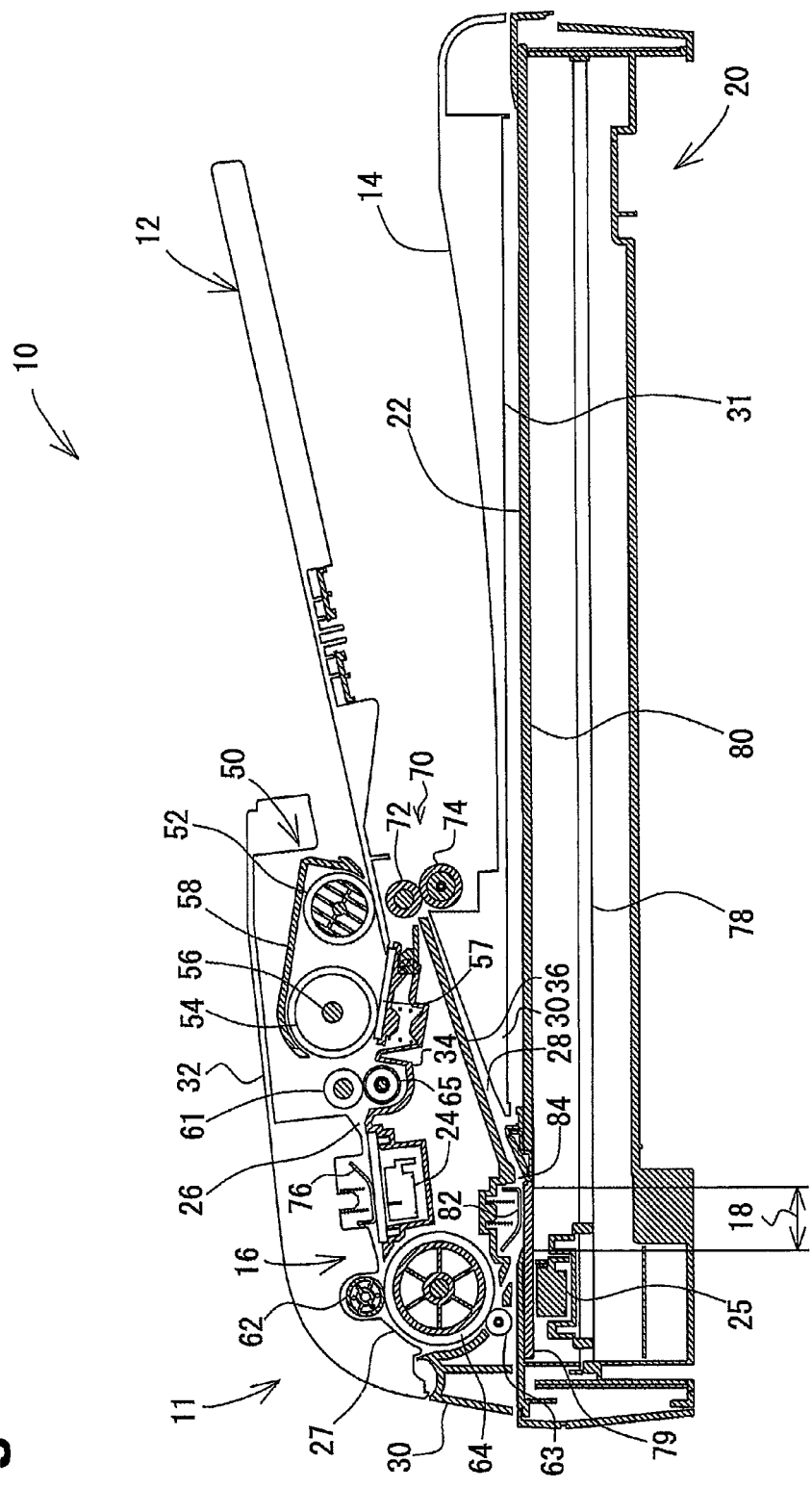
FIG. 4 is a sectional view taken along line IV-IV in FIG. 1.

FIG. 2 is a perspective view of the image processing apparatus 10 in a state in which the ADF 11 is open with respect to the image reading device 20. Actually, a white original pressing plate is disposed on a surface opposing almost whole surface of the moving reading glass 80 of a lower surface 31 of a body frame 30 of the ADF 11, but the original pressing plate is omitted in FIG. 2. FIG. 3 is a perspective view of the image processing apparatus 10 in a state in which an upper cover 32 of the ADF 11 is open. FIG. 4 is a sectional view taken along line IV-IV in FIG. 1.

The ADF 11 is disposed so as to cover the upper side of the image reading device 20, and can change its position between a "closed position" shown in FIG. 1 and an "open position" shown in FIG. 2, as mentioned above. As shown in FIGS. 3 and 4, the ADF 11 includes an original tray 12 (an example of a feed tray according to the present invention) on which original sheets are placed, and a sheet-discharge tray 14 (an example of a discharge tray according to the present invention) to which the original sheets are discharged. The original tray 12 and the sheet-discharge tray 14 are disposed vertically in two levels. More specifically, the original tray 12 is disposed above the sheet-discharge tray 14. In the embodiment, the sheet-discharge tray 14 has a recessed portion formed in the body frame 30 of the ADF 11.

The ADF 11 conveys an original sheet drawn out from the original tray 12 along a U-turn conveying path 16 (an example of a U-turn conveying path, a conveying path according to the present invention), and discharges the original sheet to the sheet-discharge tray 14. The original tray 12 can hold a plurality of original sheets in a stacked state. In a case that images are recorded on both a front surface and a back surface of the original sheet, the original sheets are held in the stacked state in order of a first page as an uppermost surface, a third page, a fifth page, and so on, that is, odd pages face upward. Even pages are back surfaces of the odd pages and face downward. The ADF 11 continuously takes out the original sheets held in the stacked state one at a time from the original tray 12. The original sheets taken out from the original tray 12 are oriented in a direction toward the sheet-discharge tray 14 along the U-turn conveying path 16 (that is, a conveying direction), and are automatically conveyed to the sheet-discharge tray 14. The ADF 11 also includes an image sensor 24. As shown in FIG. 4, when the original sheet is conveyed along the conveying path 16, the image sensor 24 reads an image recorded on a first surface (back surface) of the original sheet. For the image sensor 24, a contact image sensor (CIS) or a charged coupled device (CCD) can be typically used, but in this embodiment the image sensor 24 is a CIS. By using a CIS as the image sensor 24, the image sensor 24 can be downsized, and the ADF 11, eventually, the image processing apparatus 10 can be downsized.

The image reading device 20 includes a contact glass 22. The contact glass 22 is disposed at the upper surface of the image reading device 20. An image sensor 25 is provided below the contact glass 22. When conveying the original sheet along the U-turn conveying path 16, the image sensor 25 reads an image recorded on a second surface (front surface) of the original sheet. The image sensor 25 also can read the image on the original sheet placed on the moving reading glass 80 while moving along an after-mentioned slide shaft 78. For the image sensor 25, a CIS or a CCD is also typically used, but in this embodiment the image sensor 25 is also a CIS. The image reading device 20 may have any structure as long as the ADF 11 is applicable. But, by using a CIS as the image sensor 25, the image sensor 25 can be downsized, and the image reading device 20, eventually, the image processing apparatus 10 can be downsized.

The embodiment exemplifies the case in which the present invention is carried out by using the image reading device 20 and the ADF 11 applicable thereto. However, the present invention may be carried out by using a copier or a multifunction device (MFD) which is mounted on top of an image recording device that records an image by adhering an image recording material (such as toner or ink) to a recording sheet.

[U-Turn Conveying Path]

Figure 6:
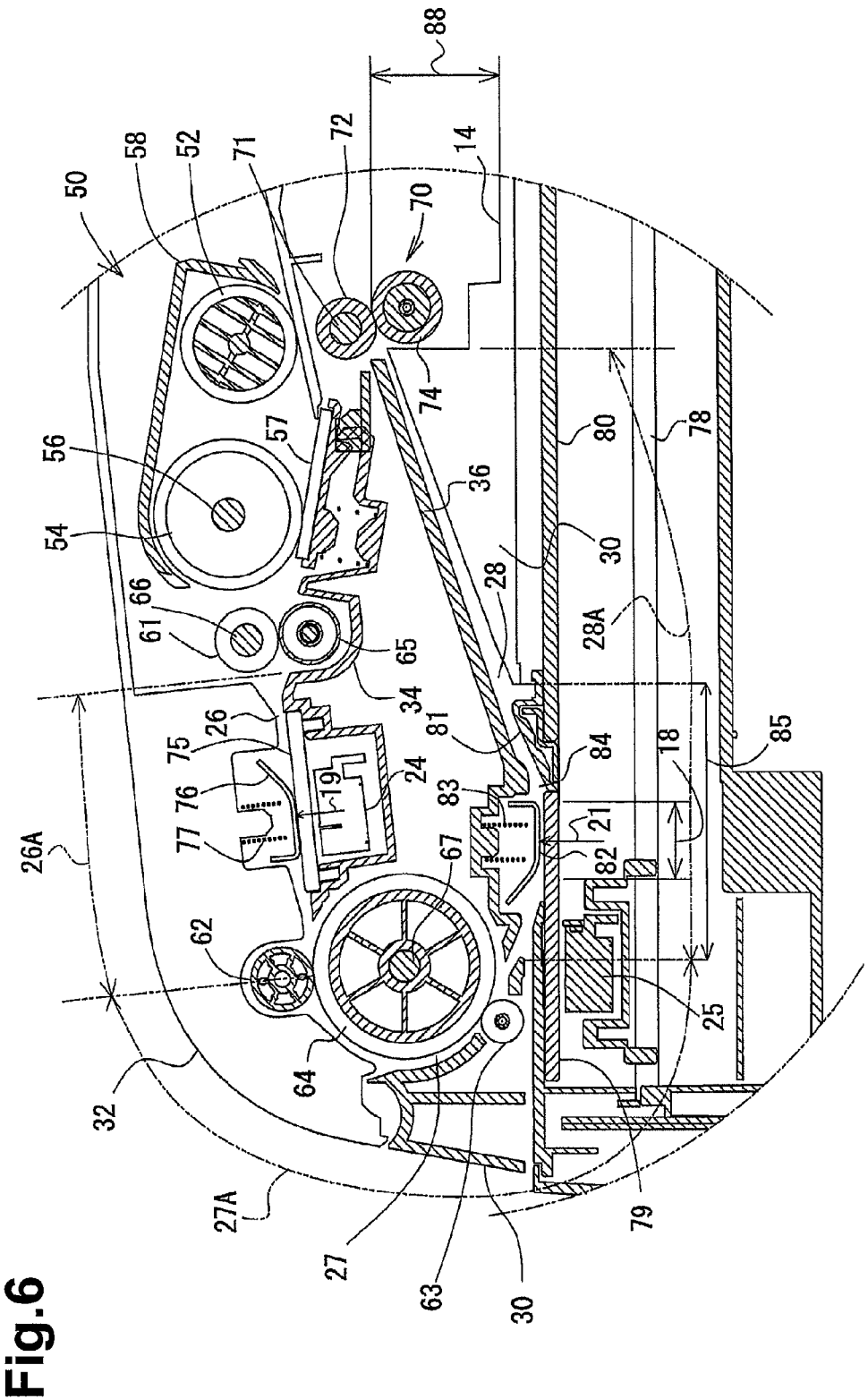
FIG. 6 is an enlarged view of the main portion in FIG. 4.

As shown in FIG. 4, the U-turn conveying path 16 includes a first conveying path 26 (an example of a first conveying path according to the present invention), a curved conveying path 27 (an example of a curved conveying path according to the present invention), and a second conveying path 28 (an example of a second conveying path according to the present invention). That is, the U-turn conveying path 16 is formed in a substantially U shape so that the original sheet placed on the original tray 12 is conveyed to the sheet-discharge tray 14. As shown in FIG. 4, the first conveying path 26 extends leftwards from the original tray 12. The original sheets to be conveyed are supplied to the first conveying path 26 by a sheet-feed unit 50 (an example of a feed unit according to the present invention), as mentioned later. In this embodiment, more specifically, as shown in FIG. 6, the first conveying path 26 is a conveying path from a left side of after-mentioned conveying roller 61 and pinch roller 65 to a nip point of after-mentioned main roller 64 and pinch roller 62. A range of the first conveying path 26 is indicated by an arrow 26A. The first conveying path 26 is formed in a substantially plate shape, as shown in FIGS. 3 and 6. The first conveying path 26 includes an image reading position 19 (an example of a first image reading position according to the present invention) where the image sensor 24 reads the first surface of the original sheet.

The curved conveying path 27 is connected with the first conveying path 26, and is curved downward in an arc shape. More specifically, as shown in FIG. 6, the curved conveying path 27 is a conveying path from a nip point of after-mentioned main roller 64 and pinch roller 62 to an after-mentioned opening 84 (an example of an opening according to the present invention). A range of the curved conveying path 27 is indicated by an arrow 27A.

The second conveying path 28 is connected with the curved conveying path 27, and extends to the upper right in the figure toward the sheet-discharge tray 14 in FIGS. 4 and 6. More specifically, as shown in FIG. 6, the second conveying path 28 is a conveying path from an after-mentioned opening 84 to a left side of an after-mentioned discharge unit 70 (a discharge roller 72 and a pinch roller 74) (an example of a discharge unit according to the present invention). A range of the second conveying path 28 is indicated by an arrow 28A. The second conveying path 28 includes an image reading position 21 (an example of a second image reading position according to the present invention) where the image sensor 25 reads the second surface of the original sheet.

The ADF 11 includes a housing. This housing includes a body frame 30, the aforementioned upper cover 32, an upper guide 34, and an under guide 36. The upper cover 32, the upper guide 34, and the under guide 36 are mounted to the body frame 30. The housing is formed of acrylonitrile-butadiene-styrene (ABS) copolymer, polypropylene (PP), polyacetal (POM), or other types of synthetic resins.

The upper guide 34 and the under guide 36 are disposed vertically in two levels. By mounting the under guide 36 to the body frame 30, the second conveying path 28 is formed between the body frame 30 and the under guide 36. That is, the under guide 36 forms a guide surface of the second conveying path 28. The upper guide 34 is mounted above the under guide 36. As shown in FIGS. 2 and 4, an opening 84 is provided in a lower surface 31 of the ADF 11. The opening 84 is provided at an end situated at a boundary portion between the second conveying path 28 and the curved conveying path 27. By providing the opening 84, the boundary portion between the second conveying path 28 and the curved conveying path 27 is exposed to the lower surface of the ADF 11. The opening 84 is positioned across a width indicated by an arrow 85. An after-mentioned predetermined position 18 is included in a range of the opening 84. Therefore, when the image sensor 25 is disposed in the predetermined position 18, the image sensor 25 can read the front surface of the original sheet at the image reading position 21.

Figure 5:
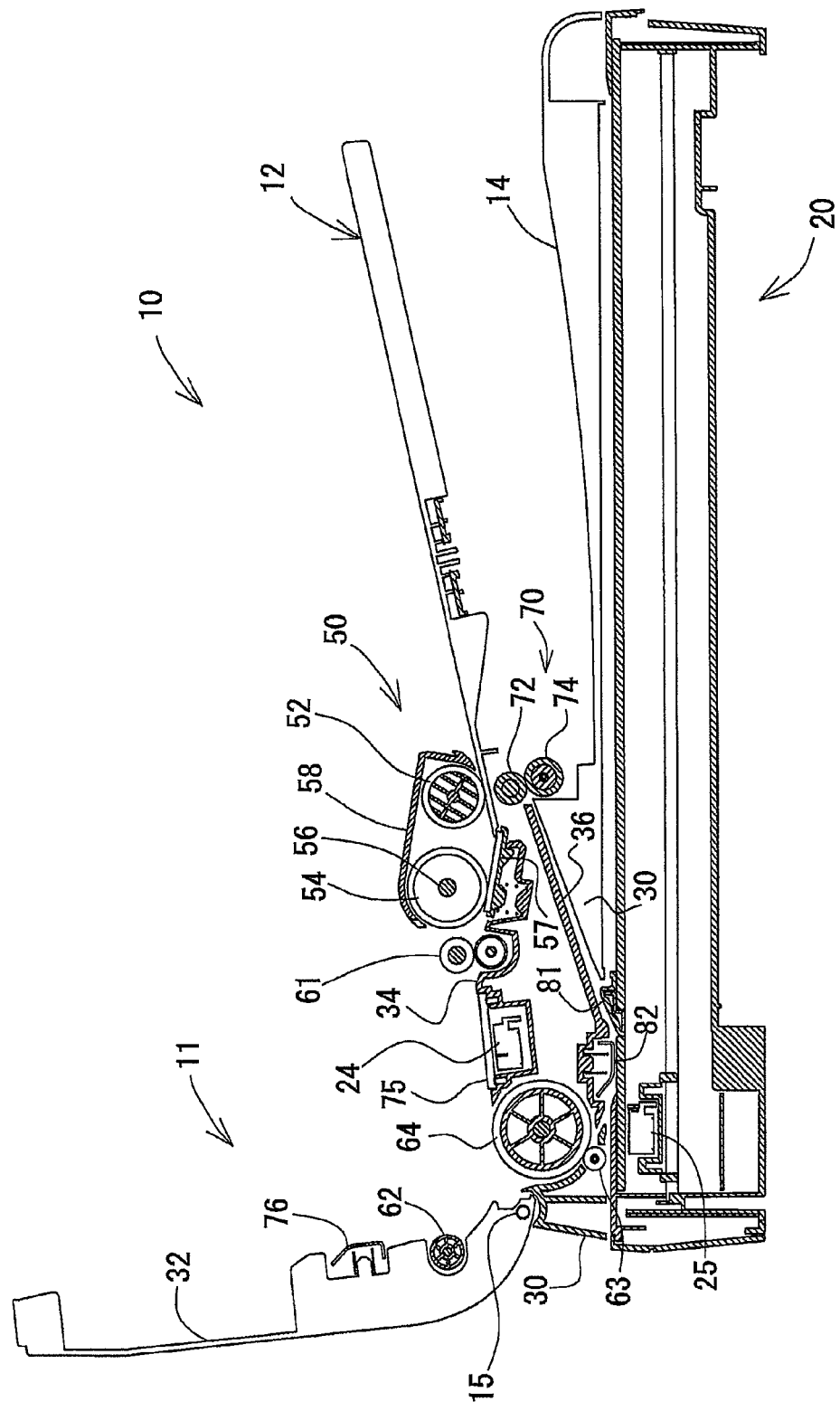
FIG. 5 is a sectional view of the image processing apparatus according to the embodiment of the present invention.

FIG. 5 is a sectional view of the image processing apparatus 10 which is taken along line IV-IV in FIG. 1, like FIG. 4. But FIG. 5 shows the image processing apparatus 10 in a state in which the aforementioned upper cover 32 is open, unlike FIG. 4.

The upper cover 32 is rotatably supported by a support shaft 15 mounted to the left end (in FIG. 5) of the body frame 30, and can be opened and closed. That is, the upper cover 32 can change its position between a closed position (shown in FIG. 4) and an open position (shown in FIG. 5). When the upper cover 32 is in the closed position, as shown in FIG. 4, a portion extending from the first conveying path 26 to the upper guide 34 is covered by the upper cover 32. A portion of the curved conveying path 27, the sheet-feed unit 50, the conveying roller 61, the pinch roller 65 and a portion of the original tray 12 are also covered by the upper cover 32.

When the upper cover 32 is in the closed position, as shown in FIG. 6, the first conveying path 26 is formed between the upper cover 32 and the upper guide 34. That is, the upper cover 32 partly forms a guide surface of the first conveying path 26.

As shown in FIG. 5, when the position of the upper cover 32 changes to the open position, the portion extending from the first conveying path 26 to the upper guide 34 is exposed. A portion of the curved conveying path 27, the sheet-feed unit 50, the conveying roller 61, the pinch roller 65 and a portion of the original tray 12 are also exposed. As shown in FIGS. 3 and 5, the pinch roller 62 and a first white member 76 are positioned on the upper cover 32. More specifically, a rotary shaft 62A of the pinch roller 62 is supported by the upper cover 32 (see FIG. 3). The first white member 76 is supported by the upper cover 32 via a coil spring 77. Therefore, when the position of the upper cover 32 changes to the open position, all the first conveying path 26 and a portion of the curved conveying path 27 are exposed. As a result, when a jamming of the original sheet occurs, the user can easily carry out a jamming prevention operation by changing the position of the upper cover 32 to the open position.

[Sheet-Feed Unit]

FIG. 6 is an enlarged view of the main portion in FIG. 4, and shows in detail the U-turn conveying path 16 and the vicinity thereof.

As shown in FIGS. 4 and 6, a sheet-feed unit 50 is disposed adjacent to the first conveying path 26. The sheet-feed unit 50 sequentially takes out the original sheets held in the stacked state one at a time in order from top from the original tray 12. The sheet-feed unit 50 is provided upstream of the first conveying path 26 in the conveying direction (that is, at the right side in FIGS. 4 and 6). The sheet-feed unit 50 includes a take-in roller 52 (an example of a take-in roller according to the present invention) and a separation roller 54 (an example of a separation roller according to the present invention) having a rotary shaft 56. As is clear from FIG. 3, both ends of the rotary shaft 56 are supported by the body frame 30. The separation roller 54 is secured to the almost center of the rotary shaft 56. The rotary shaft 56 is rotated in a predetermined direction (clockwise in FIG. 4) by an ADF motor (not shown) serving as a driving source. The separation roller 54 is rotated by rotating the rotary shaft 56.

An arm 58 is supported by the rotary shaft 56 through a bearing. The arm 58 extends toward upstream in the conveying direction from the rotary shaft 56. The take-in roller 52 is disposed an end upstream of the arm 58 in the conveying direction. The arm 58 is rotated through a predetermined driving transmission mechanism (not shown) by using the ADF motor serving as the driving source. Therefore, the arm 58 can move up and down with respect to the rotary shaft 56 as center. The take-in roller 52 is also connected to the rotary shaft 56 through a predetermined driving transmission mechanism. By this, if the rotary shaft 56 rotates, not only the separation roller 54, but also the take-in roller 52 rotates clockwise. The outside diameter of the take-in roller 52 and the outside diameter of the separation roller 54 are set the same, so that both of the rollers 52 and 54 are rotated at the same peripheral speed.

The sheet-feed unit 50 also includes a separation portion 57 (an example of a separation portion according to the present invention). The separation portion 57 is disposed so as to oppose the separation roller 54. The separation portion 57 is configured to press-contact the roller surface of the separation roller 54. The separation portion 57 is typically formed of a cork piece or an elastomer, and provides a large friction force between it and an original sheet. Therefore, if a plurality of original sheets are inserted between the separation portion 57 and the separation roller 54, at a nip point 89 (an example of a fifth nip point according to the present invention) (see FIG. 7) of the separation roller 54, only the original sheet that is in contact with the separation roller 54 is separated from other original sheets and conveyed toward the U-turn conveying path 16.

A plurality of original sheets in a stacked state are placed on the original tray 12. At this time, an original sheet is place in a state that an end of each original sheet is inserted into the sheet-feed unit 50. Furthermore, at this time, the original sheets are placed on the original tray 12 with the front surface (a surface of odd pages, an upper surface, a second surface) faced upward. An image recorded on the back surface (a surface of even pages, a lower surface, a first surface) of the original sheet taken out from the original tray 12 by the ADF 11 is read by the image sensor 24. The original sheet is further conveyed along the U-turn conveying path 16, and its front and back surfaces are reversed when the original sheet passes along the curved conveying path 27. Then, an image recorded on the front surface of the original sheet is read by the image sensor 25. Thereafter, the original sheet discharged to the sheet-discharge tray 14 has its front surface faced downward and is placed on the sheet-discharge tray 14. Therefore, even if a plurality of the original sheet are conveyed by the ADF 11 to read the image thereon, an order of the page of the original sheets will not be changed from a case that the original sheets are placed on the original tray 12 to a case that the original sheets are stacked on the discharge tray 14, though the original sheets will be turned upside down.

[Conveying Unit]

As shown in FIG. 6, a conveying unit 60 (an example of a conveying mechanism according to the present invention) includes a conveying roller 61 (a first conveying roller), a main roller 64 (an example of a driving roller according to the present invention), a pinch roller 62 (second conveying roller), and a pinch roller 63 (third conveying roller).

The conveying roller 61 is disposed adjacent to the first conveying path 26. More specifically, the conveying roller 61 is disposed immediately in front of the first conveying path 26 in the conveying direction, and is positioned more downstream in the conveying direction than the separation roller 54. The conveying roller 61 form a pair of rollers with the pinch roller 65 (an example of a pair of first conveying rollers according to the present invention). The original sheet conveyed from the separation roller 54 is nipped by the conveying roller 61 and the pinch roller 65. The conveying roller 61 rotates to supply the original sheet to the first conveying path 26.

As shown in FIG. 6, the main roller 64 is disposed at an end portion (left end portion in FIG. 6) of the body frame 30. The body frame 30, the upper cover 32 of the ADF 11, and the main roller 64 form the curved conveying path 27. That is, the body frame 30, an inner wall surface of the upper cover 32, and the outer peripheral surface of the main roller 64 form a guide surface of the curved conveying path 27. As is clear from FIG. 3, the main roller 64 comprises three rollers that are supported by only one driving shaft 67 (an example of a driving shaft according to the present invention) and are disposed at a predetermined interval. The central main roller 64 of the three main rollers 64 forms a pair of rollers with the pinch roller 62 (an example of a pair of second conveying rollers according to the present invention), and a pair of rollers with the pinch roller 63 (an example of a pair of third conveying rollers according to the present invention). The pinch roller 62 is disposed at a boundary between the first conveying path 26 and the curved conveying path 27 as mentioned above. The original sheet conveyed along the first conveying path 26 is nipped by the main roller 64 and the pinch roller 62, and is conveyed along the curved conveying path 27 in the conveying direction. The pinch roller 63 is disposed downstream of the curved conveying path 27 in the conveying direction. The original sheet conveyed along the curved conveying path 27 is nipped by the main roller 64 and the pinch roller 63, and is conveyed toward the second conveying path 28. Although, in the embodiment, the main roller 64 comprising only one driving shaft 67 forms pairs of rollers with the pinch rollers 62 and 63, a plurality of driving rollers that form pairs with these rollers 62 and 63, respectively, may be provided along the curved conveying path 27. This is a configuration in which the plurality of the driving rollers each comprising a driving shaft are provided along the curved conveying path 27, a pinch roller is provided on each of the plurality of the driving rollers. The configuration of this embodiment, in which the main roller 64 comprising only one driving shaft 67 forms pairs of rollers with the pinch rollers 62 and 63, can realize reduction of configuration and downsizing by reducing the number of the driving rollers and a drive mechanism. At a position along the curved conveying path 27 between the pinch rollers 62 and 63, other pinch roller may be provided to press the main roller 64.

The conveying roller 61 and the main roller 64 include driving shafts 66 and 67, respectively. These driving shafts 66 and 67 are driven through a predetermined driving transmission mechanism by the ADF motor (not shown) as the driving source. By this, the original sheet is conveyed in the conveying direction along the first conveying path 26 and the curved conveying path 27.

[Discharge Unit]

As shown in FIG. 6, a discharge unit 70 includes a discharge roller 72 and a pinch roller 74 (an example of a pair of discharge rollers according to the present invention). The discharge roller 72 includes a driving shaft 71. The driving shaft 71 is driven through a predetermined driving transmission mechanism by the ADF motor serving as the driving source. The discharge roller 72 is disposed immediately behind the second conveying path 28 in the conveying direction. The discharge roller 72 and the pinch roller 74 nip the original sheet conveyed along the second conveying path 28, and convey it in the conveying direction. Since the second conveying path 28 extends obliquely upward as mentioned above, the discharge roller 72 is positioned above the sheet-discharge tray 14. Therefore, the original sheet that passes the discharge roller 72 and that is discharged falls onto the sheet-discharge tray 14. Furthermore, since the discharge unit 70 is disposed below the sheet-feed unit 50, more specifically below the take-in roller 52, the second conveying path 28 is longer than the first conveying path 26, as shown by arrows 26A and 28A in FIG. 6. Therefore, even if an angle that the second conveying path 28 slants obliquely upward is not so large, that is, even if the second conveying path 28 has a gentle slant, an after-mentioned lift amount 88 can be large. As a result, a large amount of the original sheets can be held on the discharge tray 14, while a height of the ADF 11 can be downsized vertically.

The discharge roller 72 and the pinch roller 74 may not be disposed immediately behind the second conveying path 28 in the conveying direction. If the original sheet can be guided from the second conveying path 28 to the discharge tray 14, the discharge roller 72 and the pinch roller 74 may be disposed in the second conveying path 28 in the conveying direction.

[First Image Reading Section]

As mentioned above, the first image reading section (an example of a first image reading section according to the present invention) is provided at the ADF 11. The first image reading section comprises an image sensor 24 (an example of a first image sensor according to the present invention), a first image reading glass 75 (an example of a first platen according to the present invention), a first white member 76 (an example of a first pressing member according to the present invention) and a coil spring 77 (an example of a first urging member according to the present invention). The first image reading glass 75 is tabular and a surface of the first image reading glass 75 is disposed along the substantially planate first conveying path 26. The first image reading glass is disposed between the conveying roller 61 and the pinch roller 62, and the image sensor 24 is provided so as to face the first conveying path 26 from below via the first image reading glass 75. The image sensor 24 is disposed in space enclosed with the first conveying path 26, the main roller 64 and the second conveying path 28. Therefore, the original sheet that is conveyed along the substantially planate first conveying path 26 passes near the image sensor 24 along the first image reading glass 75. Here, an image recorded on the back surface (first surface) of the original sheet is read at the image reading position 19 by the image sensor 24. The first white member 76 is disposed so as to oppose the image sensor 24 via the first image reading glass 75. As shown in FIG. 3, the first white member 76 has almost the same length as the first image reading glass 75 in a longitudinal direction. A coil spring 77 is provided at the first white member 76. By this, the first white member 76 is resiliently urged toward the first image reading glass 75, that is, the image sensor 24. Therefore, the first white member 76 pushes the original sheet that is conveyed along the first conveying path 26 against the first image reading glass 75. As a result, a distance between the image sensor 24 and the back surface of the original sheet becomes constant, and a good image reading operation can be performed by a CIS whose depth of focus is smaller than a CCD. At least a surface of the first white member 76 that faces the first image reading glass 75 is white in color. By this, at a predetermined timing before reading an image, a processing of taking a white standard when the image sensor 24 reads an image is performed, but the processing is known and is not described here.

As mentioned above, the configuration of this embodiment, in which a plurality of the pinch rollers 62 and 63 are pressed against the main roller 64 comprising only one driving shaft 67, can realize reduction of configuration and downsizing by reducing the number of the driving rollers and a drive mechanism. But in this case the first image reading section needs to be disposed on the substantially planate first conveying path 26.

If the first image reading section is disposed downstream of the opening 84 of the second conveying path 28 in the conveying direction, a jamming prevention operation becomes more difficult, and the sheet-feed unit 50, the conveying roller 61 and the pinch roller 65 will be disposed above the first image reading section. By this, the image processing apparatus 10 will be larger vertically in size.

The first white member 76 of this embodiment is made of a sheeted member, but may be made of a rotary roller with a white surface instead. In this case, the rotary roller may have almost the same length as the first image reading glass 75 in a longitudinal direction and may be disposed so as to contact the first image reading glass 75 at the first image reading position 19. In this case, the rotary roller may be resiliently urged toward the first image reading glass 75, that is, the image sensor 24, by an urging member such as the coil spring 77.

[Second Image Reading Section]

As mentioned above, the second image reading section (an example of a second image reading section according to the present invention) is provided at a side of the image reading device 20. The second image reading section comprises an image sensor 25 (an example of a second image sensor according to the present invention), a stationary reading glass 79 (an example of a second platen according to the present invention), a second white member 82 (an example of a second pressing member according to the present invention) and a coil spring 83 (an example of a second urging member according to the present invention). The image sensor 25 is slidably supported by a slide shaft 78. The slide shaft 78 is secured to a housing of the image reading device 20, and extends in the illustrated left-right direction as shown in FIGS. 4 and 6. That is, the slide shaft 78 extends in the original-sheet conveying direction and in a direction opposite thereto. The image sensor 25 slides through a predetermined driving transmission mechanism by a motor (not shown) as a driving source. An example of the driving transmission mechanism in this case is a pulley-belt mechanism.

The contact glass 22 of the image reading device 20 is divided in two. That is, the contact glass 22 includes a stationary reading glass 79 and a moving reading glass 80. When the ADF 11 is not used, original sheets are placed at a predetermined position on the moving reading glass 80 one at a time by the user of the image processing apparatus. Then, images that are recorded on the original sheets facing the moving reading glass 80 are read while sliding the image sensor 25 along the slide shaft 78.

When the ADF 11 is used, the original sheets continuously pass the stationary reading glass 79. An original separation member 81 is provided between the stationary reading glass 79 and the moving reading glass 80. The original separation member 81 takes up from the stationary reading glass 79 the original sheet that has entered the second conveying path 28 and that has contacted the stationary reading glass 79. This causes the original sheet to separate from the stationary reading glass 79 and to be conveyed along the second conveying path 28.

When the ADF 11 is used, the image sensor 25 is moved to a predetermined position 18 and is stopped. By stopping the image sensor 25 at the predetermined position 18, the image sensor 25 is provided so as to face the second conveying path 28 from below via the stationary reading glass 79. The predetermined position 18 is situated at an end portion of the stationary reading glass 79 and adjacent to the original separation member 81. The original sheet is conveyed between the stationary reading glass 79 and the second white member 82 and reaches an actual image reading position 21, and is, then, taken up from the stationary reading glass 79 by the original separation member 81. The original sheet is always exposed from the opening 84 when it passes the image reading position 21. That is, an image that has been recorded on the front surface of the original sheet is exposed from the opening 84. The image sensor 25 in a standby state at the predetermined position 18 reads the exposed image at the image reading position 21.

A second white member 82 is disposed at a position corresponding to the image reading position 21. As shown in FIG. 2, the second white member 82 has almost the same length as the stationary reading glass 79 in a longitudinal direction. More specifically, the second white member 82 is provided at the under guide 36 of the ADF 11 via the coil spring 83. The second white member 82 faces the image sensor 25 in the standby state at the predetermined position 18 via the stationary reading glass 79. Therefore, the second white member 82 is resiliently urged toward the stationary reading glass 79, that is, the image sensor 25. When an edge of the original sheet that is conveyed along the second conveying path 28 reaches the second white member 82, the original sheet moves into a space between the second white member 82 and the stationary reading glass 79. The second white member 76 pushes the original sheet against the stationary reading glass 79. As a result, a distance between the image sensor 25 and the front surface of the original sheet becomes constant, and a good image reading operation can be performed by a CIS whose depth of focus is smaller than a CCD. At least a surface of the second white member 82 that faces the stationary reading glass 79 is white in color. By this, at a predetermined timing before reading an image, a processing of taking a white standard when the image sensor 25 reads an image is performed, but the processing is known and is not described here.

The second white member 82 of this embodiment is made of a sheeted member, but may be made of a rotary roller with a white surface instead. In this case, the rotary roller may have almost the same length as the stationary reading glass 79 in a longitudinal direction and may be disposed so as to contact the stationary reading glass 79 at the second image reading position 21. In this case, the rotary roller may be resiliently urged toward the stationary reading glass 79, that is, the image sensor 25, by an urging member such as the coil spring 83.

If the configuration of this embodiment is used, the first image reading section is disposed below (lower than) the sheet-feed unit 50. The first white member 76 and the first image sensor 24 of the first image reading section, and the second white member 82 and the coil spring 83 of the second image reading section are vertically disposed in space between the main roller 64 comprising only one drive shaft 67 and the sheet-feed unit 50. The first white member 76 and the first image sensor 24 of the first image reading section, and the second white member 82 and the coil spring 83 of the second image reading section are also vertically disposed in space between the curved conveying path 27 and the sheet-feed unit 50. As a result, the image processing apparatus 10 can be downsized vertically.

Figure 7:
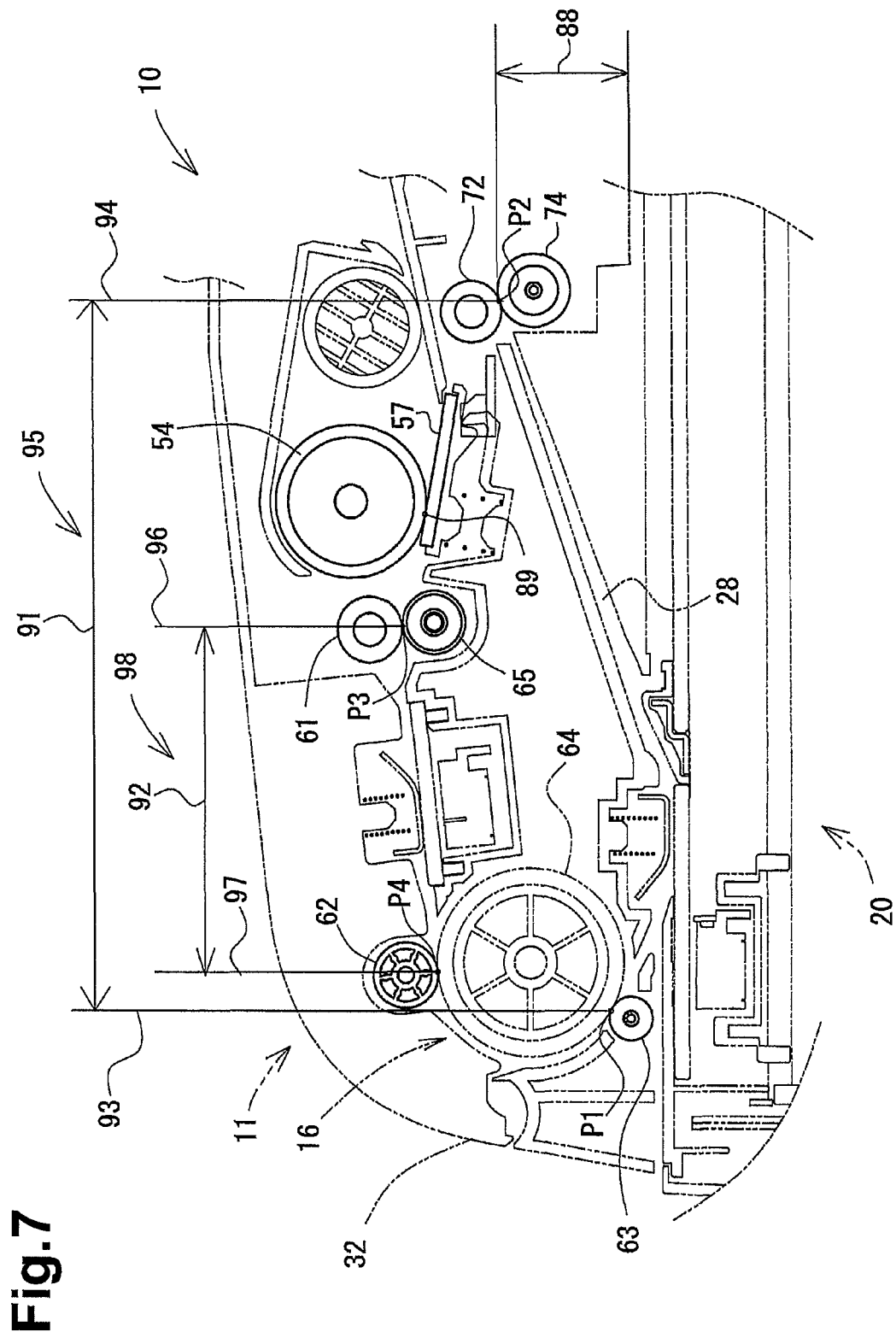
FIG. 7 is a layout of a driving system of the image processing apparatus according to the embodiment of the present invention.

FIG. 7 is a layout of a driving system of the ADF 11.

As shown in FIG. 7, in the ADF 11 according to the embodiment, the conveying roller 61 and the pinch roller 62 are positioned between the pinch roller 63 and the discharge roller 72. More specifically, a distance 91 between the pinch roller 63 and the discharge roller 72 is equal to the distance between a first span point P1 (an example of a third nip point according to the present invention) and a second span point P2 (an example of a fourth nip point according to the present invention). The first span point P1 is a nip point between the pinch roller 63 and the main roller 64. The second span point P2 is a nip point between the discharge roller 72 and the pinch roller 74. A distance 92 between the conveying roller 61 and the pinch roller 62 is the distance between a third span point P3 (an example of a first nip point according to the present invention) and a fourth span point P4 (an example of a second nip point according to the present invention). The third span point P3 is a nip point between the conveying roller 61 and the pinch roller 65. The fourth span point P4 is a nip point between the pinch roller 62 and the main roller 64. The distance 91 is greater than the distance 92, and the conveying roller 61 and the pinch roller 62 are positioned within an imaginary area 95 (an example of a first area according to the present invention) formed by imaginary lines 93 and 94 (an example of an imaginary line according to the present invention) extending upward from the first span point P1 and the second span point P2, respectively.

The nip point 89 of the separation roller 54 exists within the imaginary area 95. However, the nip point 89 exists outside an imaginary area 98 (an example of a second area according to the present invention) formed by an imaginary line 96 and 97 (an example of an imaginary line according to the present invention) extending upward from the third span point P3 and the fourth span point P4, respectively. Further, the nip point 89 is disposed closer to the second conveying path 28 than the third span point P3, that is, below the third span point P3.

[Operation of Image Processing Apparatus]

In the image processing apparatus 10, the ADF 11 operates and conveys original sheets as follows.

As shown in FIG. 6, an original sheet separated from other original sheets on the original tray 12 by the sheet-feed unit 50 is conveyed to the first conveying path 26 by the conveying roller 61 and the pinch roller 65. When the original sheet is conveyed along the first conveying path 26, an image that has been recorded on its back surface is scanned at the image reading position 19 by the image sensor 24. The original sheet is conveyed along the curved conveying path 27 by the main roller 64 and the pinch roller 62, and then is conveyed to the second conveying path 28 by the main roller 64 and the pinch roller 63. The original sheet that has entered the second conveying path 28 is temporarily exposed from the opening 84. This time, since an image of the original sheet is scanned by the ADF 11, the image sensor 25 moves to the predetermined position 18. Therefore, when the original sheet passes the opening 84, an image that has been recorded on the front surface of the original sheet is scanned at the image reading position 19 by the image sensor 25. Thereafter, the original sheet is discharged to the sheet-discharge tray 14 by the discharge roller 72.

Since the second conveying path 28 is tilted obliquely upward, the original sheet that has been conveyed along the second conveying path 28 is raised upward and, then, falls upon the sheet-discharge tray 14. Here, as shown in FIG. 8, the first distance 91 between the discharge roller 72 and the pinch roller 63 is greater than the second distance 92 between the conveying roller 61 and the pinch roller 62. Therefore, a lift amount 88 of the original sheet that is conveyed along the second conveying path 28 is large. Consequently, in the interior of the image processing apparatus 10, a large area or space for stacking the discharged original sheets upon each other is ensured. Moreover, since the conveying roller 61 and the pinch roller 62 are disposed in the imaginary area 95, the conveying roller 61 and the pinch roller 62 can be disposed vertically close to the pinch roller 63 and the discharge roller 72. That is, the conveying roller 61, the pinch roller 62, the pinch roller 63, and the discharge roller 72 are compactly disposed vertically.

Since the conveying roller 61 and the other rollers for conveying the original sheet are compactly laid out vertically, a compact design of the image processing apparatus 10 is possible. Moreover, as mentioned above, since a large area for stacking the discharged original sheets upon each other is provided, the image processing apparatus 10 can handle the required and sufficient number of original sheets while being compact.

In the embodiment, since the original tray 12 is disposed above the sheet-discharge tray 14, the original sheet is moved downward through the U-turn conveying path 16 from the original tray 12 disposed above the sheet-discharge tray 14, and is held by the sheet-discharge tray 14. Therefore, the user can easily take out any discharged original sheet. That is, handling of original sheets 58 is facilitated.

In the embodiment, since the conveying roller 61 is disposed close to the first conveying path 26, the distance 91 can be made very small. Therefore, the horizontal dimension (that is, the left-right dimension in FIG. 4) of the image processing apparatus 10 is small, so that the apparatus can be more compactly designed.

In particular, in the embodiment, the opening 84 is provided at the lower surface of the ADF 11. As mentioned above, the original sheet is exposed from the opening 84 when the image sensor 25 scans an image. By providing the opening 84, the user can deliberately take out the original sheet from the opening 84. Therefore, if what is called a jamming prevention operation needs to be performed on the original sheet that is being conveyed along the curved conveying path 27, the original sheet is immediately pulled out from the opening 84. That is, the jamming prevention operation is facilitated.

In addition, in the embodiment, as shown in FIG. 8, since the nip point 89 of the separation roller 54 is disposed at the aforementioned position, the separation roller 54 and the separation portion 57 for supplying the original sheet to the conveying roller 61 can be disposed lower than the conveying roller 61. Therefore, it is possible to make the image processing apparatus 10 thin and compact.

In this embodiment, the image processing apparatus 10 is an image processing apparatus for a two-side reading, which has a configuration in which images recorded on both sides of the original sheet are read by two image sensors 24 and 25. However, by using the same body frame as the body frame 30 and reducing a part of the components, an image processing apparatus for a one-side reading, in which an image recorded on one side of the original sheet is read while conveying from the original tray to the discharge tray, can be inexpensively configured. This is because a part of the components is configured to be removable. In this case, for example, the image sensor 24, the conveying roller 61, the pinch roller 65, the drive shaft 66, the first image reading glass 75, the first white member 76 and the coil spring 77 may be reduced. The drive mechanism for driving the drive shaft 66 of the conveying roller 61 may be also reduced. Instead of these components, other replacements required to configure the image processing apparatus for a one-side reading may be replaced as required. That is, instead of the first white member 76 and the first image reading glass 75, for example, guide members which configure the first conveying path 26 may be replaced separately.

What is claimed is:

1. An image processing apparatus comprising:
    a U-turn conveying path comprising:
        a first conveying path on which a sheet is conveyed;
        a curved conveying path having an arc shape and on which the sheet conveyed from the first conveying path is conveyed; and
        a second conveying path on which the sheet conveyed from the curved conveying path is conveyed;
    a first image reading section facing the first conveying path and configured to read an image recorded on a first surface of the sheet conveyed on the first conveying path;
    a second image reading section facing the second conveying path and configured to read an image recorded on a second surface of the sheet conveyed on the second conveying path;
    a pair of first conveying rollers positioned upstream of the first conveying path in a conveying direction and configured to nip and convey the sheet to the first conveying path;
    a pair of second conveying rollers positioned at a boundary between the first conveying path and the curved conveying path and configured to nip and conveyed the sheet to the curved conveying path;
    a pair of third conveying rollers positioned downstream of the curved conveying path in the conveying direction and configured to nip and convey the sheet to the second conveying roller; and
    a pair of discharge rollers positioned downstream of the second conveying path in the conveying direction and configured to discharge the sheet from the second conveying path,
    wherein the pair of the first conveying rollers, the pair of the second conveying rollers, the pair of the third conveying rollers and the pair of the discharge rollers are positioned such that a distance between a third nip point that each of the pair of the third conveying rollers contacts each other and a fourth nip point that each of the pair of the discharge rollers contacts each other is larger than a distance between a first nip point that each of the pair of the first conveying rollers contacts each other and a second nip point that each of the pair of the second conveying rollers contacts each other, and
    wherein the first nip point and the second nip point are positioned in a first area defined by an imaginary line extending upward from the third nip point and the fourth nip point respectively.

2. The image processing apparatus according to claim 1, further comprising:
    a feed tray configured to hold a plurality of sheets fed to the first conveying path; and
    a discharge tray configured to hold the plurality of the sheets discharged from the second conveying path;
    wherein the feed tray is positioned above the discharge tray.

3. The image processing apparatus according to claim 1, wherein the pair of the first conveying rollers is positioned adjacent to the first conveying path.

4. The image processing apparatus according to claim 1, wherein an opening is positioned at a boundary between the curved conveying path and the second conveying path such that the sheet moving from the curved conveying path to the second conveying path is exposed via the opening.

5. The image processing apparatus according to claim 1, further comprising:
    a separation roller and a separation portion configured to separate the plurality of the sheets one by one and feed the separated sheet toward upstream of the first conveying roller in the conveying direction,
    wherein a fifth nip point that the separation roller and the separation portion contacts each other is positioned outside a second area defined by an imaginary line extending upward from the first nip point and the second nip point respectively and disposed closer to the second conveying path than the first nip point.

6. The image processing apparatus according to claim 1, wherein
    the first image reading section is disposed below the first conveying path and comprises a first image sensor which reads the image recorded on the first surface of the sheet conveyed along the first conveying path at a first image reading position, and
    the second image reading section comprises a second image sensor which reads the image recorded on the second surface of the sheet conveyed along the second conveying path from below the second conveying path at a second image reading position;
    wherein the image processing apparatus further comprises:
        a feed tray disposed upstream of the first conveying path in the conveying direction and configured to hold a plurality of sheets in a stacked state;
        a feed unit configured to separate one of the plurality of the sheets held on the feed tray and feed the separated sheet toward the first image reading position; and
        a discharge tray disposed below the pair of discharge rollers and configured to hold the sheet discharged from the second conveying path by the pair of discharge rollers,
    wherein the second conveying path extends obliquely upward from the second image reading position to the pair of discharge rollers.

7. The image processing apparatus according to claim 6,
wherein the feed unit comprises a separation roller and a take-in roller disposed upstream of the separation roller in the conveying direction, and
wherein the pair of discharge rollers are disposed below the take-in roller.

8. The image processing apparatus according to claim 6,
wherein the first image reading section is disposed lower than the feed unit vertically.

9. The image processing apparatus according to claim 8,
wherein the second image reading section comprises:
  a second platen formed in a plate shape, which is transparent and configures a part of the second conveying path;
  a second pressing member configured to press the sheet at the second image reading position on the second platen toward the second image sensor; and
  a second urging member configured to urge the second pressing member toward the second platen, and
wherein the first image reading section and the second pressing member are vertically disposed in space between the feed unit and the curved conveying path.

10. The image processing apparatus according to claim 9,
wherein the first image reading section comprises:
  a first platen formed in a plate shape, which is transparent and configures a part of the first conveying path;
  a first pressing member configured to press the sheet at the first image reading position on the first platen toward the first image sensor; and
  a first urging member configured to urge the first pressing member toward the first platen, and
wherein the first pressing member, the first image sensor and the second pressing member are vertically disposed in space between the feed unit and the curved conveying path.

11. The image processing apparatus according to claim 9,
wherein the conveying mechanism comprises a driving roller that comprises only one drive shaft in the curved conveying path and forms a guide surface of the curved conveying path, and
wherein the first image reading section and the second pressing member are vertically disposed in space between the driving roller and the feed unit.

12. The image processing apparatus according to claim 11,
wherein the first image reading section comprises:
  a first platen formed in a plate shape, which is transparent and configures a part of the first conveying path;
  a first pressing member configured to press the sheet at the first image reading position on the first platen toward the first image sensor; and
  a first urging member configured to urge the first pressing member toward the first platen, and
wherein the first pressing member, the first image sensor and the second pressing member are vertically disposed in space between the driving roller and the feed unit.

13. The image processing apparatus according to claim 11,
wherein the first image sensor is disposed in space enclosed with the first conveying path, the driving roller and the second conveying path.

* * * * *